Figure 1:
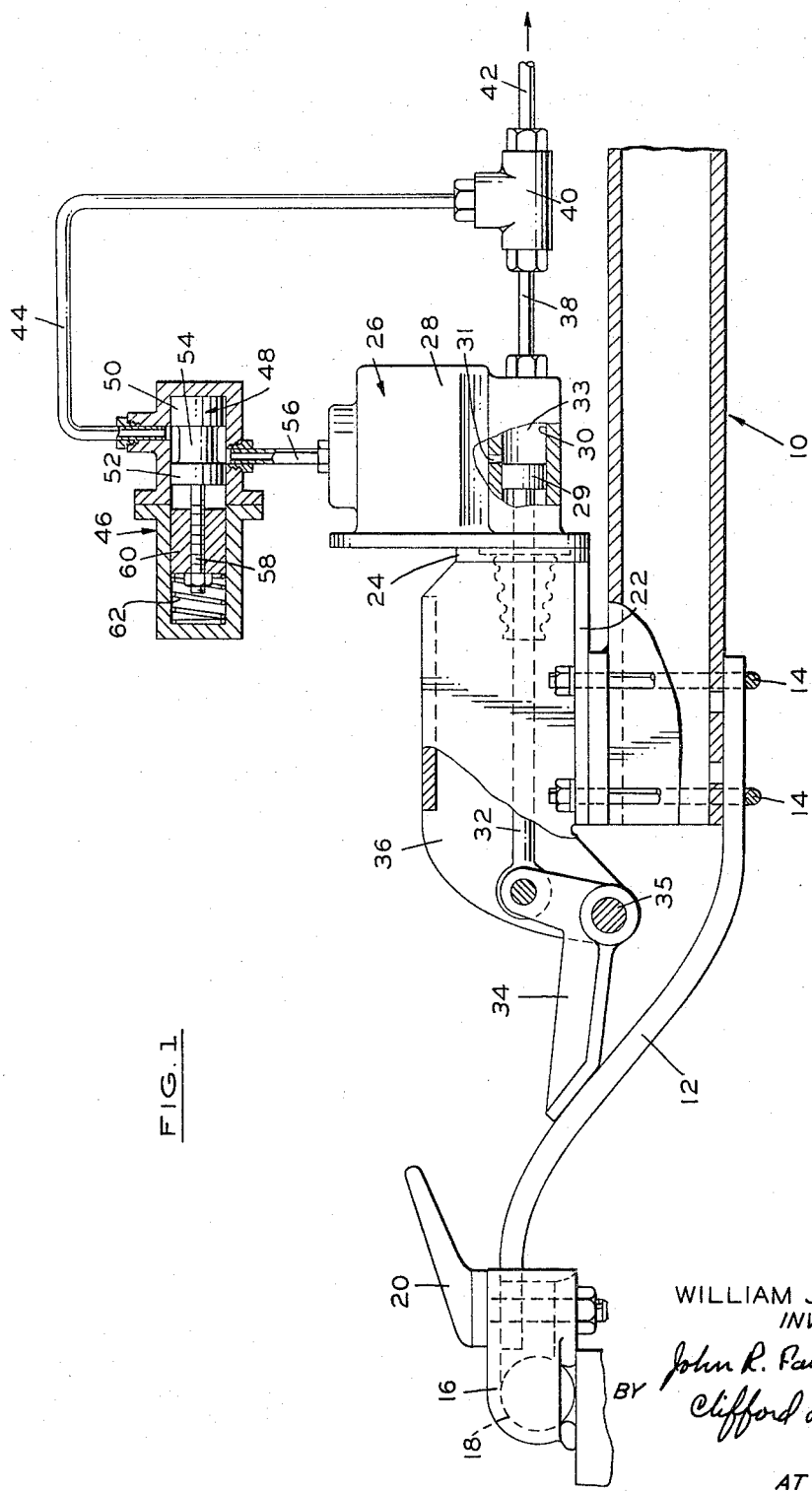

Sept. 6, 1966  W. J. PAYNE  3,271,085
VEHICLE TRAILER BRAKE ACTUATING MECHANISM
Filed Nov. 24, 1964  2 Sheets-Sheet 1

WILLIAM J. PAYNE
INVENTOR

BY John R. Faulkner
Clifford L. Sadler
ATTORNEYS

Sept. 6, 1966                    W. J. PAYNE                    3,271,085
                    VEHICLE TRAILER BRAKE ACTUATING MECHANISM
Filed Nov. 24, 1964                                      2 Sheets-Sheet 2
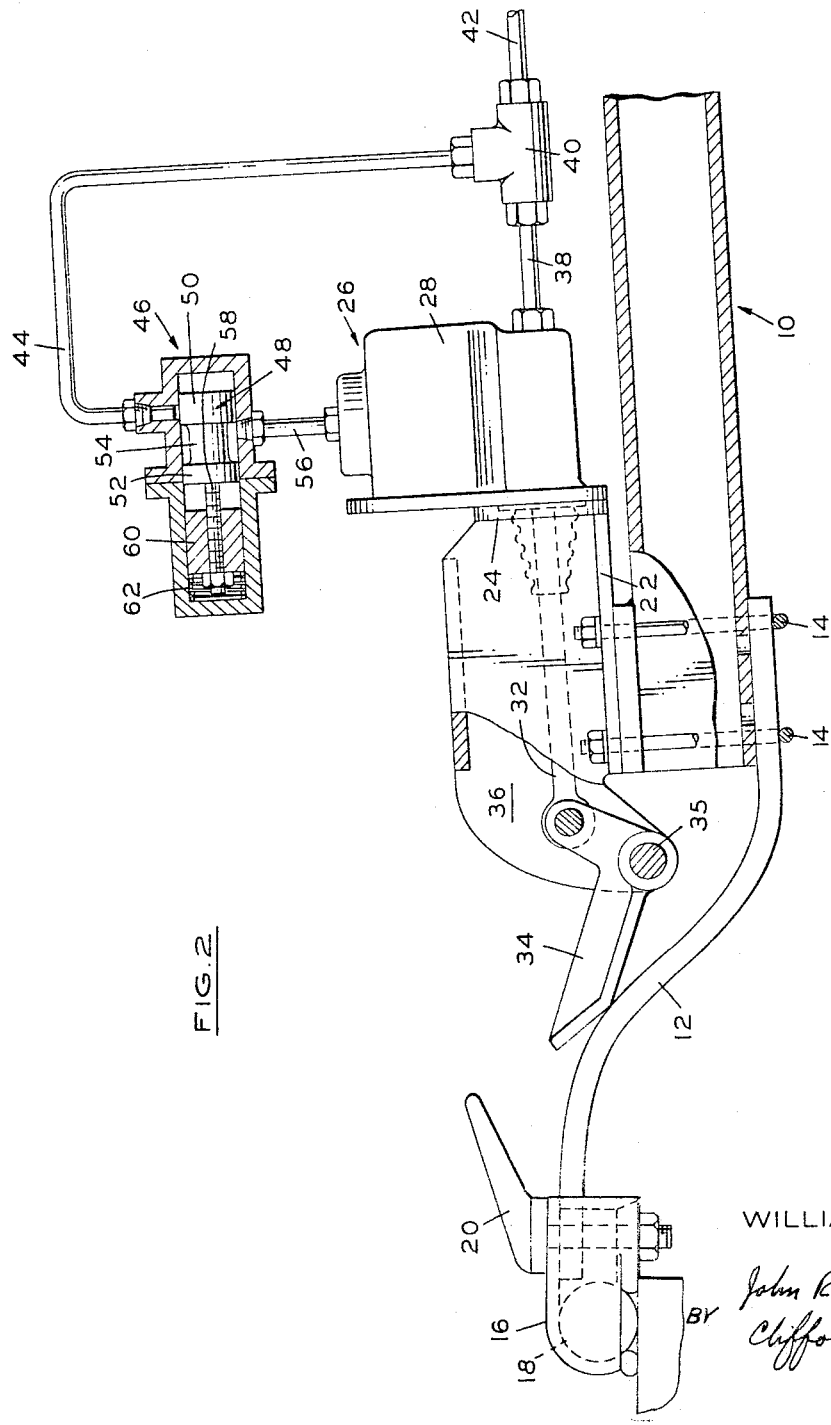
WILLIAM J. PAYNE
INVENTOR
BY John R. Faulkner
   Clifford L. Sadler
ATTORNEYS United States Patent Office 3,271,085
Patented Sept. 6, 1966

3,271,085
VEHICLE TRAILER BRAKE ACTUATING MECHANISM
William J. Payne, Livonia, Mich., assignor to Ford Motor Company, Dearborn, Mich., a corporation of Delaware
Filed Nov. 24, 1964, Ser. No. 413,411
5 Claims. (Cl. 303—18)

The present invention relates generally to brakes for trailers, and more particularly to an automatic brake for a trailer.

Safety dictates that trailers pulled by automobiles and other vehicles should be equipped with brakes rather than rely solely on the brakes of the towing vehicle for stopping purposes. Where the trailer does not have brakes, the brakes of the towing vehicle are overloaded during hard stopping. In addition, the trailer tends to swerve and sidesway and may even jackknife.

Conventionally, trailer brakes are tied in with the hydraulic brake system of the towing vehicle. This requires some type of coupling system between the brake systems of the trailer and the automobile. It is also common practice to provide the trailer with an independent brake system such as electric brakes actuated by a control device situated at the driver's position in the towing vehicle. This type of system also requires a special connection between the towing vehicle and the trailer.

In view of the state of the art, it is the principal object of the present invention to provide a braking system for a trailer that is independent of the brakes for the towing vehicle and which is automatically responsive to the deceleration of that vehicle.

It is also an object of the present invention to provide an automatic brake for a trailer which does not require any special connection with the towing vehicle.

More specifically, it is an object of the present invention to provide an embodiment in which a leaf spring member forms a part of the tongue or drawbar of the trailer and which flexes to operate a brake master cylinder when the towing vehicle decelerates. This brake master cylinder is hydraulically connected to the brake units at the trailer wheels. It is a further object to provide a deactivating valve system which senses deceleration deflection of the leaf spring tongue rather than jounce and rebound deflection of that tongue.

The many objects and advantages of the present invention will be more fully understood upon consideration of the following discussion and the accompanying drawings in which:

FIGURE 1 is a side elevational view, partly in schematic form, illustrating the brake operating device of the present invention in association with the tongue of a trailer; and FIGURE 2 is a side elevational view of the device of FIGURE 1 showing the several components of the device in their position during brake application.

Referring now to the drawings, wherein FIGURE 1 illustrates the tongue or drawbar 10 of a vehicle trailer to which a leaf spring member 12 has been secured by a pair of U-bolts 14. The leaf spring member 12 has a socket mechanism 16 secured at its forward end for engagement with a ball that is carried by the hitch of a towing vehicle. An engaging cam device 20 is provided to lock the socket 16 about the ball 18.

The U-bolts 14 also secure a supporting plate 22 to the tongue 10. The supporting plate 22 has an end flange 24 to which a brake master cylinder assembly 26 has been secured.

The brake master cylinder 26 is of conventional construction having a reservoir chamber 28 in its upper part and its lower part containing an operating piston 29 and cylinder 30 construction. A port 31 in the wall of the cylinder 30 provides communication between the reservoir chamber 28 and the hydraulic fluid contained therein with the pressure chamber 33 defined by cylinder 30 and the piston 29.

The piston 29 within the cylinder 30 is operated by a push rod 32 which has its forward end connected to a bell crank 34. The bell crank 34 is pivotally supported at 35 by support structure 36 which is connected to the plate 22. The bell crank 34 has a forward end which engages the leaf spring portion 12 of the tongue 10.

A hydraulic line 38 extends rearwardly from the outlet of the pressure chamber 33. It is connected to a T-fitting 40. The T-fitting 40 has one line 42 which is connected to the wheel cylinder of the brakes (not shown) at the trailer wheels.

The other line from the T-fitting 40 is indicated by the reference numeral 44 and is connected to a valve device 46. The valve device 46 contains a spool element 48 which has a pair of spaced apart lands 50 and 52. Between the lands 50 and 52 is a reduced diameter portion 54 which permits the line 44 from the T-fitting 40 to be in free communication with a conduit 56 that is connected to the reservoir chamber 20 of the brake master cylinder.

A threaded extension 58 extends forwardly from the spool valve 48 and is connected to an inertia element 60. A coil spring 62 biases the weight 60 and the spool valve 48 to the right-hand direction as illustrated in FIGURE 1. Under these conditions, fluid is free to flow through conduit 38 from the outlet of pressure chamber 33 to the T-fitting 40. Fluid flows from fitting 40 through the conduit 44, past valve element 48, through the conduit 56, and back to the reservoir 28. Because the reservoir 28 is at atmospheric pressure, a pressure build-up is prevented in the outlet of the pressure chamber 33 at those times when the spring 62 has valve 48 seated in the right-hand direction.

With reference to FIGURE 2, the arrangement of the components when the towing vehicle is decelerating is disclosed. Under such conditions, the tendency of the center of gravity of the trailer vehicle (which is assumed to be higher than the axle for the trailer wheels) is to move forwardly causing the tongue 10 to be forced downwardly. This condition causes the leaf spring 12 to flex and thereby force the bell crank 34 in clockwise rotation. This movement causes the piston 30 to force hydraulic fluid under pressure out of the outlet passage 38. The fluid forced out of the hydraulic outlet passage 38 will travel to the wheel brakes through the line 42.

Under deceleration conditions, the weight 60 of the valve assembly 46 will move under the effects of inertia to a left-hand direction compressing the spring 62. This will cause the land 50 of the spool valve element 48 to seal the outlet of conduit 44. Thus, under deceleration conditions, the fluid pressure increase will be transmitted fully to the wheel brakes and fluid will not be permitted to return to the reservoir chamber 48.

It is seen that the deceleration of the towing vehicle produces two effects. The first is to cause the spring portion 12 of the tongue 10 to flex in a manner so that the bell crank 34 will actuate the power piston 29 in cylinder 30. The second effect occurs within the valve 46 where the return line 44 is sealed shut.

During normal jounce and rebound movement as the trailer travels over irregularities in the road, the spring portion of the tongue 12 will flex causing the bell crank 38 to pump the piston within the cylinder 30. Under such conditions, however, the spring 62 will maintain the return line 44 in an open condition and in free communication with the atmospheric reservoir chamber 28. Thus, during normal jounce and rebound movement of the vehicle, trailer fluid will merely be pumped from the chamber 33 to the reservoir 28. There will not be a pressure build-up to cause actuation through the conduit 42 of the brakes of the trailer. Only during deceleration, when the weight 60 overcomes the force of the spring 62 does the return line 44 become closed to permit a pressure build-up in the lines 34 and 42.

The foregoing description constitutes the presently preferred embodiment of this invention. Modifications and alterations of the present invention may occur to those skilled in the art and which will come within the scope and spirit of the following claims.

I claim:

1. A vehicle trailer brake comprising a rigid support structure, a resiliently flexible tongue portion connected to said structure and adapted to be hitched to a towing vehicle, a brake master cylinder assembly connected to said support structure, said master cylinder assembly having a pressure chamber and a reservoir chamber, a fluid pressure outlet from said pressure chamber adapted to be connected to the wheel brakes of a trailer, means responsive to the reflexing of said resilient tongue portion constructed to force pressure fluid from said actuating chamber, said means comprising a bell crank pivotally supported on said support structure and having one end engaging said resilient tongue portion, the other end of said bell crank being connected to a piston within said pressure chamber, a fluid bypass passage interconnecting the pressure outlet of said pressure chamber with said reservoir chamber, valve means interposed in said bypass passage, said valve means being spring pressed to a normally open position, inertia means responsive to the deceleration of said trailer constructed to close said valve means and seal said bypass passage.

2. A vehicle trailer brake comprising a rigid tongue support structure, a resiliently flexible tongue portion connected to said structure and adapted to be hitched to a towing vehicle, a brake master cylinder assembly connected to said support structure, said master cylinder assembly having a pressure chamber and a reservoir chamber, a fluid pressure outlet from said pressure chamber adapted to be connected to the wheel brakes of a trailer, means responsive to the reflexing of said resilient tongue portion constructed to force pressure fluid from said actuating chamber, a fluid bypass passage interconnecting the pressure outlet of said pressure chamber with said reservoir chamber, valve means interposed in said bypass passage, said valve means being spring pressed to a normally open position, inertia means responsive to the deceleration of said trailer constructed to close said valve means and seal said bypass passage.

3. A vehicle trailer brake comprising a rigid tongue support structure, a resiliently flexible tongue portion connected to said structure and adapted to be hitched to a towing vehicle, a brake master cylinder assembly connected to said support structure, said master cylinder assembly having a pressure chamber and a reservoir chamber, a fluid pressure outlet from said pressure chamber adapted to be connected to the wheel brakes of a trailer, means responsive to the reflexing of said resilient tongue portion constructed to force pressure fluid from said actuating chamber, a fluid bypass passage interconnecting the pressure outlet of said pressure chamber with said reservoir chamber valve means interposed in said bypass passage, said valve means being responsive to the deceleration of said trailer constructed to close said valve means and seal said bypass passage.

4. A vehicle trailer brake comprising a rigid tongue support structure, a resiliently flexible tongue portion connected to said structure and adapted to be hitched to a towing vehicle, a brake master cylinder assembly connected to said support structure, said master cylinder assembly having a pressure chamber and a reservoir chamber, a fluid pressure outlet from said pressure chamber adapted to be connected to the wheel brakes of a trailer, means responsive to the reflexing of said resilient tongue portion constructed to force pressure fluid from said actuating chamber, said means comprising a bell crank pivotally supported on said support structure and having one end engaging said resilient tongue portion, the other end of said bell crank being connected to a piston within said pressure chamber.

5. A vehicle trailer brake comprising a rigid tongue support structure, a resiliently flexible tongue portion connected to said structure and adapted to be hitched to a towing vehicle, a brake master cylinder assembly connected to said support structure, said master cylinder assembly having a pressure chamber and a reservoir chamber, a fluid pressure outlet from said pressure chamber adapted to be connected to the wheel brakes of a trailer, means responsive to the reflexing of said resilient tongue portion constructed to force pressure fluid from said actuating chamber, said means comprising a bell crank pivotally supported on said support structure and having one end engaging said resilient tongue portion, the other end of said bell crank being connected to a piston within said pressure chamber, a fluid bypass pressure interconnecting the pressure outlet of said passage chamber with said reservoir chamber, valve means interposed in said bypass passage, said valve means being responsive to the deceleration of said trailer constructed to close said valve means and seal said bypass passage.

No references cited.

EUGENE G. BOTZ, *Primary Examiner.*